(12) United States Patent
Kaufmann et al.

(10) Patent No.: US 9,168,590 B2
(45) Date of Patent: Oct. 27, 2015

(54) TANGENTIAL INDEXABLE CUTTING INSERT

(71) Applicant: Kennametal Inc., Latrobe, PA (US)

(72) Inventors: Igor Kaufmann, Nürnberg (DE); Rudi Hartlöhner, Tuchenbach (DE); Franz Havrda, Großenseebach (DE)

(73) Assignee: KENNAMETAL INC., Latrobe, PA (US)

( * ) Notice: Subject to any disclaimer, the term of this patent is extended or adjusted under 35 U.S.C. 154(b) by 271 days.

(21) Appl. No.: 13/975,493

(22) Filed: Aug. 26, 2013

(65) Prior Publication Data

US 2014/0064864 A1    Mar. 6, 2014

(30) Foreign Application Priority Data

Aug. 28, 2012    (DE) .......................... 10 2012 017 024

(51) Int. Cl.
*B23C 5/02* (2006.01)
*B23B 27/16* (2006.01)
*B23B 27/14* (2006.01)

(52) U.S. Cl.
CPC ........... *B23B 27/1611* (2013.01); *B23B 27/141* (2013.01); *B23B 27/1607* (2013.01); *B23B 2200/0471* (2013.01); *B23B 2200/081* (2013.01); *B23B 2200/204* (2013.01); *B23B 2200/369* (2013.01); *B23B 2200/3681* (2013.01); *B23C 2200/367* (2013.01); *Y10T 407/23* (2015.01); *Y10T 407/235* (2015.01)

(58) Field of Classification Search
CPC ............ B23B 27/1611; B23B 27/1622; B23B 27/164; B23B 27/1651; B23B 2200/201; B23B 2200/20; B23B 2200/208; B23B 2200/369; B23C 5/207; B23C 5/202; B23C 5/2213; B23C 5/2221; B23C 5/2273; B23C 5/2282; B23C 2200/08; B23C 2200/201; B23C 2200/367; Y10T 407/23
USPC .......................................................... 407/113
See application file for complete search history.

(56) References Cited

U.S. PATENT DOCUMENTS

| | | | |
|---|---|---|---|
| 6,238,146 B1 | 5/2001 | Satran et al. | |
| 2011/0052337 A1* | 3/2011 | Dudzinsky et al. | 407/40 |
| 2012/0195700 A1* | 8/2012 | Chen et al. | 407/40 |

FOREIGN PATENT DOCUMENTS

DE        10 2007 022 535 A1    5/2007

* cited by examiner

*Primary Examiner* — Sunil K Singh
*Assistant Examiner* — Alan Snyder
(74) *Attorney, Agent, or Firm* — Larry R. Meenan

(57) ABSTRACT

A tangential indexable cutting insert having eight lips which are distributed in pairs over four side faces of the indexable cutting insert, each lip being formed by a main lip which is formed by the intersection of one of the side faces with a base face, a secondary lip, which is formed by the intersection of the side face with an adjacent side face, and a corner edge (5) adjoining the main lip and the secondary lip, is distinguished by the fact that the main lip has a front portion (4a) which is located at the level of the corner edge, a rear portion which is located at a lower level closer to a center axis of the indexable cutting insert, and a transition portion between the front portion and the rear portion, the three portions being located in one plane.

12 Claims, 5 Drawing Sheets

TANGENTIAL INDEXABLE CUTTING INSERT

CLAIM TO PRIORITY

This application is a National entry application of German Application No. 102012017024.6, filed on Aug. 28, 2012, the entire contents of which is Incorporated herein by reference.

FIELD OF THE INVENTION

The invention relates to a tangential indexable cutting insert having eight lips which are distributed in pairs over four side faces of the indexable cutting insert, each lip being formed by a main lip, which is formed by the intersection of one of the side faces with a base face, a secondary lip, which is formed by the intersection of the side face with an adjacent side face, and a corner edge adjoining the main lip and the secondary lip.

BACKGROUND OF THE INVENTION

Such an indexable cutting insert is known from DE 10 2007 022 536 A1. The cutting body of this indexable cutting insert is formed by two in the broadest sense truncated-pyramid-like cutting body halves which are rotated with respect to one another and merge into one another by way of their small base faces. The external, large base faces form the two base faces of the indexable cutting insert. The side faces extending between the base faces are configured in an identical manner to one another, such that a total of eight identical lips are available, said lips being available successively for machining a workpiece by rotating and/or turning the cutting insert in the tool holder.

SUMMARY OF THE INVENTION

The object of the invention is to further develop the known cutting insert such that an improved cutting performance is achieved.

In order to achieve this object, it is provided according to the invention, in the case of a cutting insert of the type mentioned at the beginning, that the main lip has a front portion which is located at the level of the corner edge, a rear portion which is located at a lower level closer to the center axis of the indexable cutting insert, and a transition portion between the front portion and the rear portion, the three portions being located in one plane. The invention is based on the basic concept of subdividing the main lip into three portions, the transition portion being arranged in an oblique manner and, on account of its orientation, causing a reduction in the passive force during the machining of a workpiece, that is to say to a reduction in the restoring force. The reason for this is that the cutting operation in the region of the transition portion produces a force component which is oblique to the line which is defined by the front portion and the rear portion of the main lip. The obliquely oriented force vector can be broken down into a component which is perpendicular to this line and a component that acts parallel to this line. The component acting parallel to the line "pulls" the workpiece toward the cutting insert, thereby reducing the passive force. As a result, the forces acting on the workpiece during machining are reduced and machining precision is increased.

It is preferably provided that the transition portion, the front portion and/or the rear portion extend in a straight line. In this way, the cutting geometry between the main lip and the workpiece can be controlled easily.

According to one configuration of the invention, it is provided that the rake face follows the profile of the main lip. The resulting step-shaped geometry of the rake face has a positive effect on chip formation.

It is preferably provided that a comparatively small radius, in particular less than 2 mm, particularly preferably of the order of 1 mm, is provided at the transition from the front portion of the main lip to the transition portion. Such a radius has been found to be a good compromise between, on the one hand, an as far as possible defined start of the transition portion, which is obtained by a small radius, and, on the other hand, the avoidance of sharp transitions which could result in local stress concentrations and damage to the main lip.

Preferably, a radius which is larger than the radius at the transition from the transition portion to the front portion of the main lip is used at the transition from the transition portion to the rear portion of the main lip. This ensures that damaging load concentrations at the concave transition between the rear portion of the main lip and the transition portion are avoided.

It is preferably provided that the length ratios between the front portion, the transition portion and the rear portion of the main lip are around 1:1:2. The comparatively long rear portion of the main lip ensures that it is possible to work with high cutting depth during roughing. The relatively short front portion of the main lip ensures that the advantageous reduction in the restoring force is already achieved at a comparatively low cutting depth.

According to one configuration of the invention, it is provided that the angle between the front portion of the main lip and the secondary lip is of the order of 70° to 90°, in particular of the order of 80°. As a result the possible uses of the indexable cutting plate are increased.

BRIEF DESCRIPTION OF THE DRAWINGS

The invention is described in the following text with reference to a preferred embodiment which is illustrated in the appended drawings, in which.

DETAILED DESCRIPTION OF THE INVENTION

FIGS. 1 to 4 show a tangential indexable cutting insert 1 which, couched in simple terms, is defined between two mutually parallel, square base faces 2 and four similar side faces 3. The side faces extend between in each case two edges of the base faces 2. With reference to a system of coordinates illustrated in FIG. 1, a central insert axis A1, which is perpendicular to the two base faces 2, extends in the Y direction. An axis A2 which is perpendicular thereto extends in the Z direction and is perpendicular to two mutually opposing side faces 3. An axis A3 which is perpendicular both to the central axis A1 and to said axis A2 and extends perpendicularly to the two other opposing side faces 3 extends in the X direction.

Located in the plane defined by the axes A2 and A3 which are perpendicular to the side faces 3 is the central plane of the cutting insert 1, wherein the two base faces 2 are spaced apart equidistantly from said central plane along the central axis A1.

Figure 2:
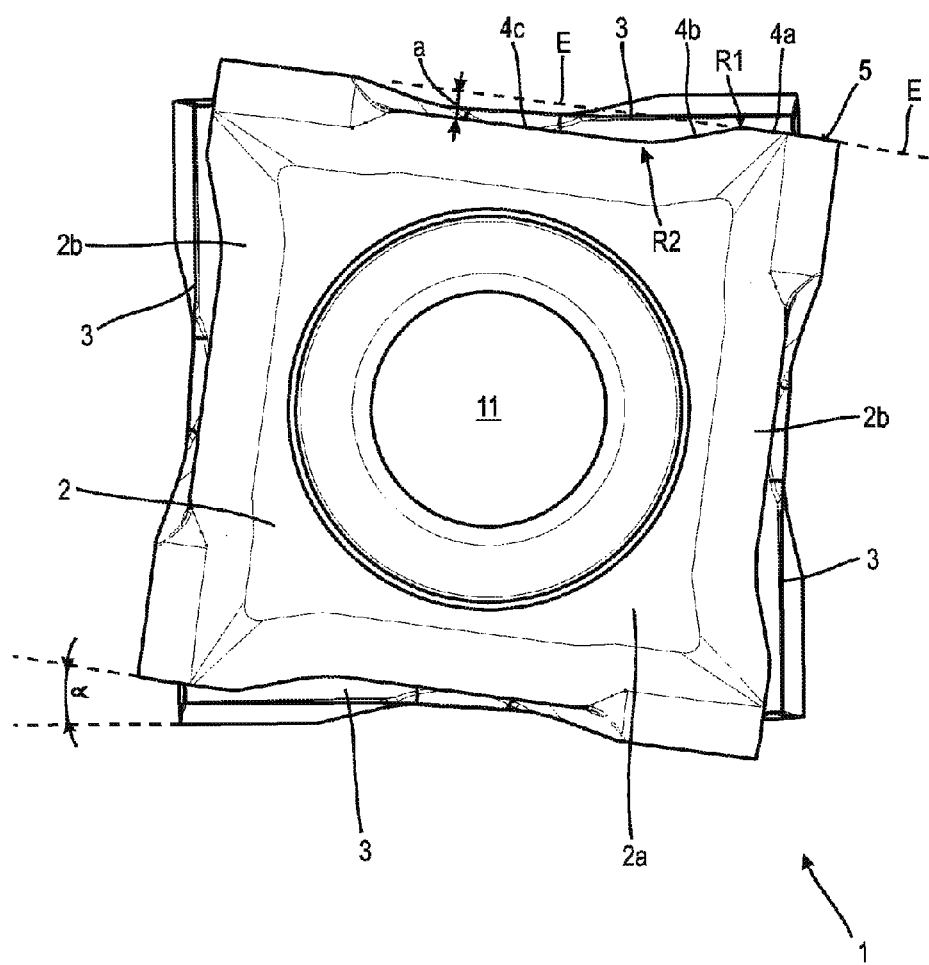
FIG. 2 shows a side view of the indexable cutting insert from FIG. 1.
Figure 3:
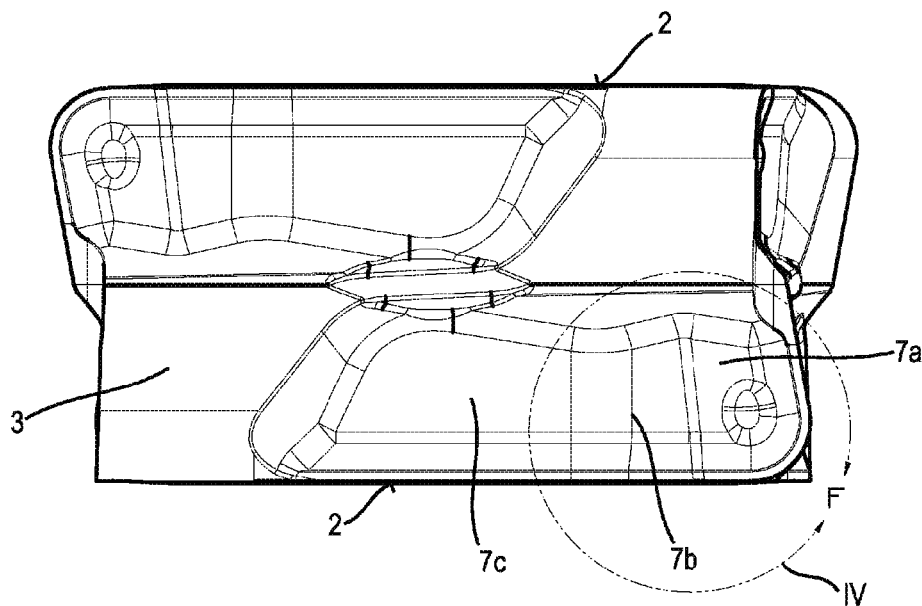
FIG. 3 shows a plan view of the indexable cutting insert from FIG. 1.

The two base faces 2 of the cutting insert 1 are rotated with respect to one another about the central axis A1, as can be seen in FIG. 2. The rotation angle α of the two base faces 2 is greater than 0° and smaller than 20° and is preferably 10°+/5°. Preferably, the rotation angle is in the region of a conventional and typical clearance angle of around 6° and is preferably around 8°. On account of the base faces 2 rotated with respect to one another about in each case around 4° with respect to the X direction (and likewise to the Z direction), two cutting body halves 1a and 1b, so to speak, of the cutting insert 1 are formed, said cutting body halves 1a and 1b adjoining one another or merging into one another in the central plane (XZ plane) defined by the two axes A2 and A3.

Figure 4:
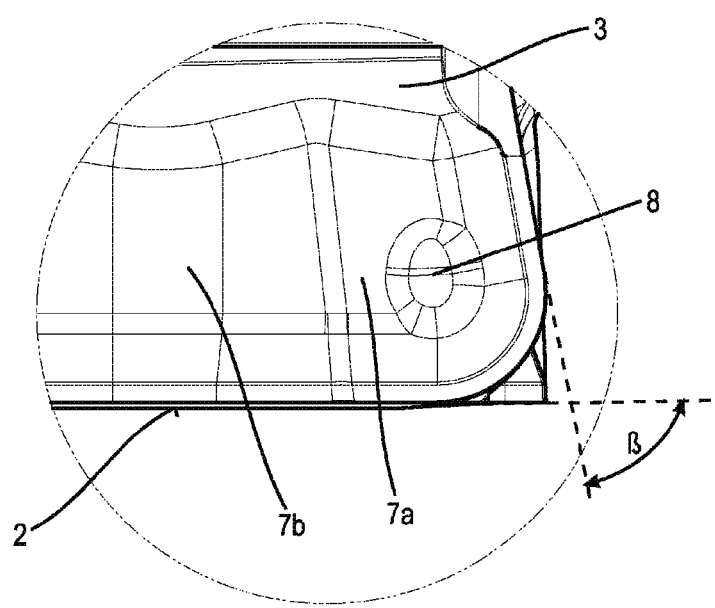
FIG. 4 shows the detail IV from FIG. 3 on an enlarged scale.
Figure 5:
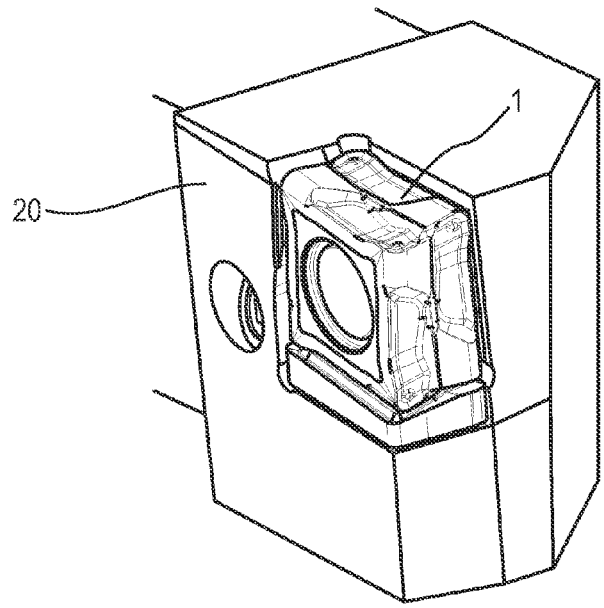
FIG. 5 shows a perspective view of the indexable cutting insert from FIG. 1 mounted in a tool holder.
Figure 6:
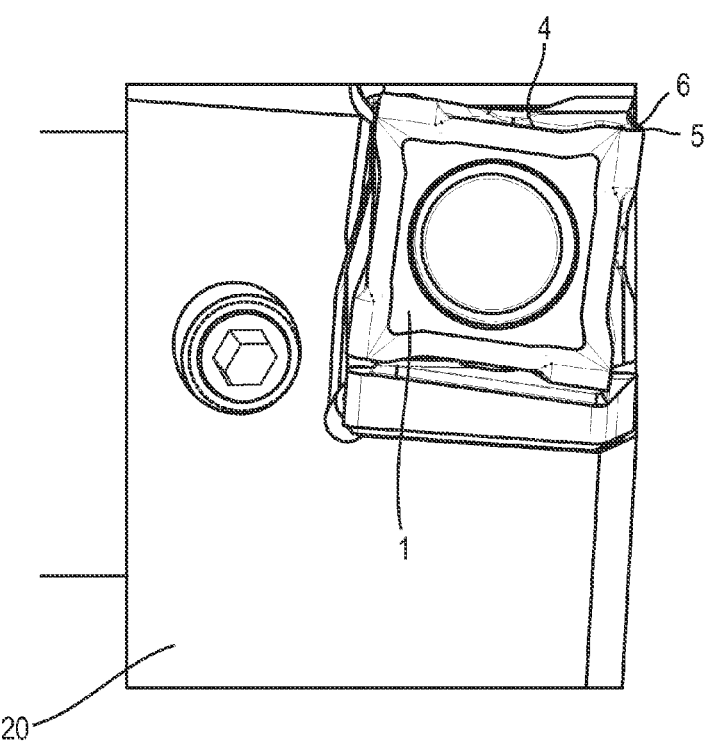
FIG. 6 shows a side view of the tool holder from FIG. 5.
Figure 7:
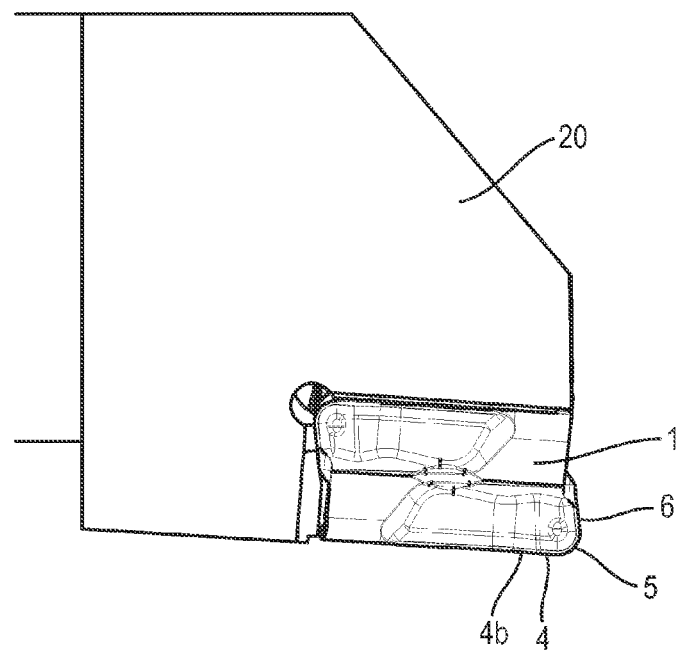
FIG. 7 shows a plan view of the tool holder from FIG. 5.
Figure 8:
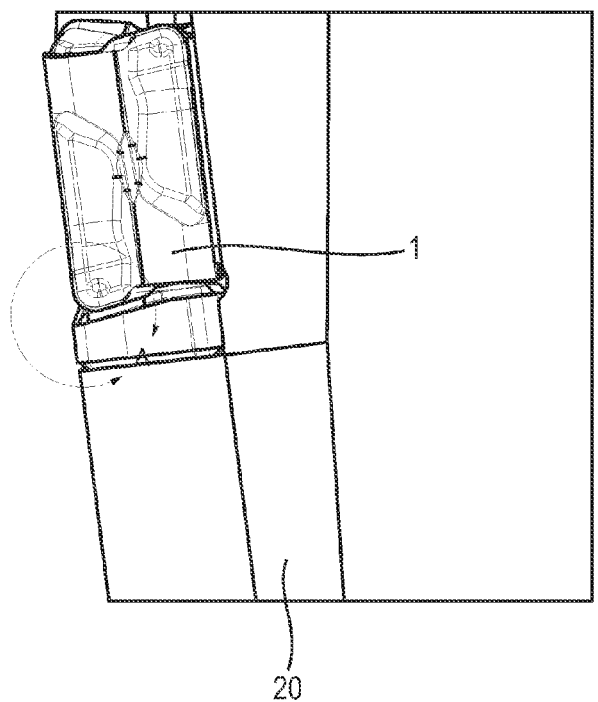
FIG. 8 shows a front view of the tool holder from FIG. 5.

Each of the similar or identical side faces 3 forms with each base face 2 a main lip 4 which extends only along a part of the length of the respective side face 3. In addition, each side face 3 has mutually opposing rounded or arcuate corner edges 5. The respective corner edge (corner radius) 5 forms a secondary lip 6 adjoining the respective main lip 4 and extending into the side face 3 adjoining said side face 3. As is illustrated in FIG. 4, the angle β, as seen in plan view, between the main lip 4 and the secondary lip 6 is around 80°.

Each cutting edge formed by the main lip 4, corner edge 5 and secondary lip 6 is assigned a chip pocket 7 drawn into the respective side face 3, that is to say inwardly arched (concavely) toward the central axis A1. Two chip pockets 7 (just like the associated main lips 4, the corner edges 5 and the secondary lips 6) are thus located diagonally opposite one another within the respective side face 3.

Each main lip 4 is formed by three portions, specifically a front portion 4a, a transition portion 4b and a rear portion 4c. The front portion 4a directly adjoins the corner edge 5 and extends from the latter toward a central plane which is defined between the axes A1 and A2, and A1 and A3, respectively. In this case, the secondary lip 6, the corner edge 5 and the front portion 4a of the main lip 4 are located in one and the same plane. This plane is indicated by E in FIG. 2 for the front, upper right-hand cutting corner.

The front portion 4a of the main lip 4 is adjoined by the transition portion 4b which extends "inwardly" obliquely to the plane E. In other words, the main lip 4 extends closer to the axis A1 in the region of the transition portion 4b. The transition portion 4b is adjoined by the rear portion 4c of the main lip 4. Said rear portion 4c extends in turn parallel to the front portion 4a and thus also parallel to the plane E, but at a distance a "beneath" the plane E, that is to say closer to the axis A1.

In relation to the plane E, the transition portion 4b of the main lip 4 drops at an angle of the order of 10 to 15°. As seen in the side view of FIG. 2, the length ratio between the front portion 4a, the transition portion 4b and the rear portion 4c of the main lip 4 is around 1:1:2. All of the portions 4a to 4c of the main lip 4 extend in a straight line, a transition radius R1 of the order of 1 to at most 2 mm being located between the front portion 4a and the transition portion 4b. Provided between the transition portion 4b and the rear portion 4c is a transition radius R2 which is much larger than the transition radius R1 and is of the order of 5 mm. These examples relate to an indexable cutting insert having an inscribed circle of three quarters of an inch.

Each chip pocket 7 has a front portion 7a, a transition portion 7b and a rear portion 7c, such that the chip pocket as a whole follows the profile of the main lip. Arranged in the front portion 7a of the chip pocket 7 is a raised chip breaker 8.

A central fastening opening 11 through the cutting insert extends along the axis A1, such that the cutting insert can be attached to a tool holder by means for example of a fastening screw or some other fixing means.

Figure 1:
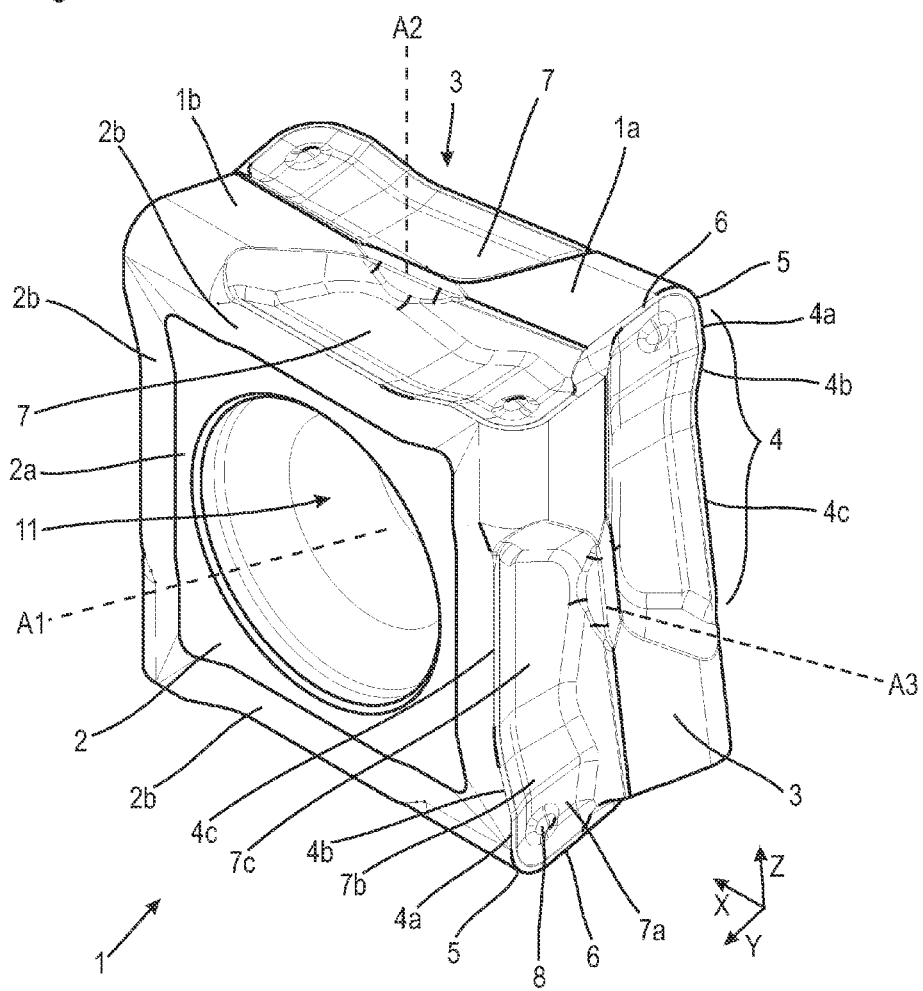
FIG. 1 shows a perspective view of an indexable cutting insert according to the invention.

As is indicated in FIGS. 1 and 2, the base face 2 is not completely flat, but is composed of a planar, internal portion 2a and external base face portions 2b which recede slightly inward, that is to say toward a plane defined by the axes A2, A3, in order to form a flank. However, for the purposes of simplification, the base face 2 can be assumed here to be generally planar.

In FIGS. 5 to 8, the tangential indexable cutting insert 1 is shown mounted in a receptacle of a tool holder 20. As can be seen in particular in FIGS. 6 and 8, the indexable cutting insert is in this case mounted in a manner rotated about the axes A1 and A3, such that the in this case active lip having the main lip 4, corner edge 5 and secondary lip 6 is available at the desired clearance angles. On account of the transition portion 4b of the main lip 4 together with the transition portion 7b of the chip pocket 7, the desired reduction in passive force, in particular during roughing with a high cutting depth, is produced.

What is claimed is:

1. A tangential indexable cutting insert having eight lips which are distributed in pairs over four side faces of the indexable cutting insert, each lip being formed by a main lip, which is formed by the intersection of one of the side faces (3) with a base face, a secondary lip, which is formed by the intersection of the side face with an adjacent side face, and a corner edge adjoining the main lip and the secondary lip, wherein the main lip has a front portion which is located at the level of the corner edge, a rear portion which is located at a lower level closer to a center axis of the indexable cutting insert, and a transition portion between the front portion and the rear portion, the front portion, the rear portion and the transition portion transition portion being located in one plane.

2. The indexable cutting insert as claimed in claim 1, wherein the transition portion extends in a straight line.

3. The indexable cutting insert as claimed in claim 1, wherein the front portion extends in a straight line.

4. The indexable cutting insert as claimed in claim 1, wherein the rear portion extends in a straight line.

5. The indexable cutting insert as claimed in claim 1, wherein a rake face follows profile of the main lip.

6. The indexable cutting insert as claimed in claim 1, wherein a comparatively small radius (R1) is provided at a transition from the front portion of the main lip to the transition portion.

7. The indexable cutting insert as claimed in claim 6, wherein the radius (R1) is around 1 mm.

8. The indexable cutting insert as claimed in claim 6, wherein a radius (R2), which is larger than the radius (R1) at the transition from the transition portion to the front portion of the main lip, is located at a transition from the transition portion to the rear portion of the main lip.

9. The indexable cutting insert as claimed in claim 1, wherein a ratio of the length between the front portion, the transition portion and the rear portion of the main lip are around 1:1:2.

10. The indexable cutting insert as claimed in claim 1, wherein the front portion of the main lip and the corner edge are located in one plane.

11. The indexable cutting insert as claimed in claim 1, wherein an angle (β) between the front portion of the main lip and the secondary lip is of the order of 70° to 90°.

12. The indexable cutting insert as claimed in claim 1, wherein the corner edge is rounded or arcuate.

* * * * *